US009266488B2

(12) United States Patent
Lang et al.

(10) Patent No.: US 9,266,488 B2
(45) Date of Patent: Feb. 23, 2016

(54) METHOD AND CONTROL UNIT FOR ASCERTAINING A TYPE OF COLLISION OF A VEHICLE

(75) Inventors: Gunther Lang, Stuttgart (DE); Arunkumar Montaganahalli Srinivasa-Murthy, Karnataka (IN); Jochen Wieland, Renningen (DE); Jens Melchert, Gerlingen (DE); Philip Mayer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 559 days.

(21) Appl. No.: 13/514,924

(22) PCT Filed: Dec. 6, 2010

(86) PCT No.: PCT/EP2010/068921
§ 371 (c)(1),
(2), (4) Date: Aug. 17, 2012

(87) PCT Pub. No.: WO2011/069939
PCT Pub. Date: Jun. 16, 2011

(65) Prior Publication Data
US 2012/0310485 A1    Dec. 6, 2012

(30) Foreign Application Priority Data
Dec. 10, 2009 (DE) .......... 10 2009 054 473

(51) Int. Cl.
*B60R 21/0132* (2006.01)
*G06F 7/00* (2006.01)
*B60R 21/00* (2006.01)

(52) U.S. Cl.
CPC ..... *B60R 21/0132* (2013.01); *B60R 2021/0002* (2013.01); *B60R 2021/01322* (2013.01); *B60R 2021/01327* (2013.01)

(58) Field of Classification Search
CPC ............ B60R 21/0132; B60R 21/0134; B60R 21/0136; B60R 2021/01327; B60R 2021/0018; B60R 2021/0019; B60R 21/36; B60T 2201/024; B60W 2520/105; B60W 2520/125; B60W 2720/106; B60G 2400/104; B60N 2/4235
See application file for complete search history.

(56) References Cited

U.S. PATENT DOCUMENTS 5,513,109 A * 4/1996 Fujishima ............ 701/45
5,961,562 A   10/1999 Iyoda
(Continued)

FOREIGN PATENT DOCUMENTS

DE  10 2004 029 816   1/2006
EP       1 607 273    12/2005
(Continued)

OTHER PUBLICATIONS
International Search Report for PCT/EP2010/068921, dated Mar. 24, 2011.

Primary Examiner — James Trammell
Assistant Examiner — Demetra Smith-Stewart
(74) Attorney, Agent, or Firm — Kenyon & Kenyon LLP

(57) ABSTRACT

A method for ascertaining a type of collision of a vehicle includes: receiving acceleration information items, via a reception interface, representing the accelerations of the vehicle in a vehicle longitudinal direction and a vehicle transverse direction; determining a first resultant acceleration information item from a first and a second acceleration information item; determining a second resultant acceleration information item from a third and a fourth acceleration information item; combining the first and second resultant acceleration information items to obtain at least one evaluation information item; and determining the collision type based on the at least one evaluation information item.

13 Claims, 6 Drawing Sheets

(56) References Cited

U.S. PATENT DOCUMENTS

| | | | |
|---|---|---|---|
| 6,036,224 A * | 3/2000 | Wachter et al. | 280/735 |
| 6,216,070 B1 * | 4/2001 | Hayashi et al. | 701/45 |
| 6,243,632 B1 * | 6/2001 | Jung | 701/45 |
| 6,292,728 B1 * | 9/2001 | Masegi | 701/45 |
| 6,390,498 B1 * | 5/2002 | Francis et al. | 280/735 |
| 7,546,193 B2 * | 6/2009 | Oishi et al. | 701/45 |
| 8,265,831 B2 * | 9/2012 | Foo et al. | 701/45 |
| 8,392,070 B2 * | 3/2013 | Foo et al. | 701/45 |
| 2002/0016658 A1 | 2/2002 | Imai et al. | |
| 2004/0102883 A1 * | 5/2004 | Sala et al. | 701/46 |
| 2005/0010340 A1 * | 1/2005 | Peravali et al. | 701/29 |
| 2006/0069483 A1 * | 3/2006 | Hayasaka et al. | 701/45 |
| 2006/0069509 A1 * | 3/2006 | Hayasaka | 701/301 |
| 2006/0224288 A1 * | 10/2006 | Mattes et al. | 701/45 |
| 2008/0243343 A1 * | 10/2008 | Kumagai et al. | 701/46 |
| 2009/0099749 A1 * | 4/2009 | Hayasaka et al. | 701/70 |
| 2010/0057302 A1 * | 3/2010 | Foo et al. | 701/45 |
| 2010/0324774 A1 * | 12/2010 | Bouni et al. | 701/29 |

FOREIGN PATENT DOCUMENTS

| | | | |
|---|---|---|---|
| GB | 2 403 935 | | 1/2005 |
| JP | 6-56000 | | 3/1994 |
| JP | 9-132108 | | 5/1997 |
| JP | 10-86787 | | 4/1998 |
| JP | 11-502028 | | 2/1999 |
| JP | 2003-261003 | | 9/2003 |
| JP | 2004191194 A | * | 7/2004 |
| JP | 2007-521182 | | 8/2007 |
| JP | 2007-530339 | | 11/2007 |
| WO | WO 97/22009 | | 6/1997 |

* cited by examiner

METHOD AND CONTROL UNIT FOR ASCERTAINING A TYPE OF COLLISION OF A VEHICLE

BACKGROUND OF THE INVENTION

1. Field of the Invention

The present invention relates to a method for ascertaining a type of collision of a vehicle, a corresponding control unit, and a corresponding computer program product.

2. Description of the Related Art

Published German patent application document DE 10 2004 029 816 A1 relates to a device for recognizing an accident in the automobile sector with the aid of an acceleration sensor which is mounted in the vehicle at an angle relative to a transverse axis of the vehicle.

BRIEF SUMMARY OF THE INVENTION

The core of the present invention is a function for collision type recognition with the aid of peripheral XY sensors. For example, dual-channel peripheral acceleration sensors may be used. By vector addition of linearly independent sensor signals, for example X signals and Y signals, resultant acceleration signals may be computed based on the linearly independent sensor signals. With the aid of a signal processing system and a suitable algorithm, the collision type recognition may be carried out on the basis of the resultant acceleration signals.

The present invention may be based on a use of dual-channel peripheral acceleration sensors, for example XY sensors situated in the B-column of the vehicle. Signal preprocessing may be carried out in which, for example, the signals provided by the peripheral acceleration sensors are subjected to low-pass filtering. A resultant acceleration may be subsequently computed from the two single channels of the peripheral sensors. The computation may be based on vector addition. Signal processing, for example with the aid of integration or difference formation, may then be carried out, and a subsequent algorithm for collision type recognition may be executed. The algorithm may be a specialized logic system having threshold value comparisons.

The approach according to the present invention, compared to the use of centralized sensors or the use of single-channel peripheral acceleration sensors, advantageously allows improved collision type recognition with regard to angled, offset, and head-on collisions. In particular, better separability of angled and offset collisions is possible. In addition, it may be possible to dispense with sensors in the central control unit. In contrast to a single-channel acceleration sensor which is installed at a fixed angle, a quasi-infinitely adjustable sensing direction may be set by different weighting of the X and Y components in the vector addition.

The present invention provides a method for ascertaining a type of collision of a vehicle, including the following steps: receiving a first acceleration information item, a second acceleration information item, a third acceleration information item, and a fourth acceleration information item via a reception interface, the first acceleration information item representing an acceleration of the vehicle in a first direction, the second acceleration information item representing an acceleration of the vehicle in a second direction, the third acceleration information item representing an acceleration of the vehicle in a third direction, and the fourth acceleration information item representing an acceleration of the vehicle in a fourth direction, the first and third directions each having a main component in a vehicle longitudinal direction, and the second and fourth directions each having a main component in mutually opposite vehicle transverse directions; determining a first resultant acceleration information item from the first acceleration information item and the second acceleration information item, and determining a second resultant acceleration information item from the third acceleration information item and the fourth acceleration information item; combining the first resultant acceleration information item and the second resultant acceleration information item in order to obtain at least one evaluation information item; and ascertaining the collision type based on the at least one evaluation information item.

The collision type may define the way in which an impact of the vehicle with an obstruction occurs, for example, on which side of the vehicle the collision occurs, and whether the vehicle strikes a barrier or another vehicle at an angle or head-on, and whether there is a complete or partial overlap. Thus, the collision type may be a head-on collision, an offset collision, or an angled collision. The acceleration information items may represent signals or values which are provided by acceleration sensors mounted in the vehicle. The acceleration information items may indicate a variation over time of accelerations of the vehicle in different directions. Two of the acceleration information items may relate to a vehicle longitudinal axis, and two of the acceleration information items may relate to a vehicle transverse axis. The main components of the acceleration information items may be based precisely on the particular vehicle axis, or may have an angular offset thereto. The two resultant acceleration information items may be determined by vector addition of the acceleration information items. Thus, the resultant acceleration information items may each map a variation over time of an acceleration of the vehicle along a specified direction. For further processing, the variations over time of the resultant acceleration information items may be summed. The combination of the resultant acceleration information items may include sum, difference, and/or ratio formation. The collision type may be ascertained by suitable comparisons with threshold values.

According to one specific embodiment, the starting points of the main components of the first and the second direction may be situated offset with respect to one another in relation to the vehicle transverse direction. This applies, for example, when the acceleration information items are provided by sensors which are situated on opposite sides of the vehicle. The starting points may be defined by a position of the sensors in the vehicle. For example, the sensors on opposite sides of the vehicle may be situated on a vehicle transverse axis. "On a vehicle transverse axis" may mean that the sensors are situated at the same or practically the same distance from a front end or a rear end of the vehicle. If multiple sensors are situated on one or both sides of the vehicle, at different distances from the front end of the vehicle, in each case signals of oppositely situated sensors may be used according to the present invention. If a sensor whose signals are used fails, the signals of an adjacent sensor may be used instead.

The resultant acceleration information items may each be determined by vector addition of the corresponding acceleration information items. The direction information items of the acceleration information items are maintained in this way.

The method according to the present invention may include a step of weighting of the first acceleration information item using a first weighting value, weighting of the second acceleration information item using a second weighting value, weighting of the third acceleration information item using a third weighting value, and weighting of the fourth acceleration information item using a fourth weighting value in order to obtain a weighted first, second, third, and fourth acceleration information item. In the determination step, the first resultant acceleration information item may be determined from the weighted first acceleration information item and the weighted third acceleration information item, and the second resultant acceleration information item may be determined from the weighted second acceleration information item and the weighted fourth acceleration information item. Desired sensing directions may be set as a result of the different weighting values. The resultant acceleration information items in each case may relate to these sensing directions.

In the combination step, a difference may be formed from the first resultant acceleration information item and the second resultant acceleration information item. In the ascertainment step, the difference may be compared to a threshold value in order to recognize the collision type. In particular, a distinction between an angled or offset collision and a head-on collision may be made in this way.

In addition, in the ascertainment step the difference may be compared to a further threshold value in order to decide whether or not to deploy restraint means during the collision. Unnecessary deployment of occupant protection means may thus be avoided.

In addition, in the combination step a sum may be formed from the first resultant acceleration information item and the second resultant acceleration information item, and a quotient may be formed from the difference and the sum. In the ascertainment step, the quotient may be compared to a further threshold value in order to recognize the collision type and/or to associate a side of the vehicle with the collision. In particular, a distinction may thus be made between an angled or offset collision and a head-on collision with complete overlap.

The present invention also provides a control unit which is designed to carry out or implement the steps of the method according to the present invention. The object of the present invention may also be quickly and efficiently achieved by this embodiment variant of the present invention in the form of a control unit.

In the present context, a control unit may be understood to mean an electrical device which processes sensor signals, and as a function thereof outputs control signals. The control unit may have an interface which may be designed using hardware and/or software. In a hardware design the interfaces may, for example, be part of a so-called system ASIC which contains various functions of the control unit. However, the interfaces may also be dedicated integrated circuits, or may be composed, at least partially, of discrete components. In a software design the interfaces may be software modules which are present, for example, on a microcontroller in addition to other software modules.

Also advantageous is a computer program product having program code which is stored on a machine-readable medium such as a semiconductor memory, a hard drive memory, or an optical 30, memory and is used for carrying out the method according to one of the above-described specific embodiments when the program is executed on a control unit.

DETAILED DESCRIPTION OF THE INVENTION

Figure 1:
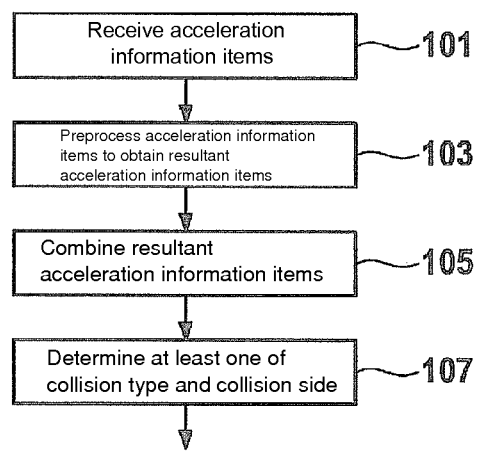
FIG. 1 shows a flow chart of a method for collision type recognition according to one exemplary embodiment of the present invention.

In the following description of preferred exemplary embodiments of the present invention, identical or similar reference numerals are used for the elements having a similar action which are illustrated in the various figures, and a repeated description of these elements is dispensed with.

FIG. 1 shows a flow chart of a method for ascertaining a type of collision of a vehicle according to one exemplary embodiment of the present invention. The method may be carried out after an occurrence of the collision has been recognized. Additionally or alternatively, the method may be used for recognizing the occurrence of a collision.

In a step 101, acceleration information items are received which are provided by sensors mounted in the vehicle. The sensors may be acceleration sensors which may be mounted at various positions in the vehicle. A sensor may also provide multiple acceleration information items with which different acceleration directions are associated. For example, two of the acceleration information items may be based on acceleration values of the vehicle which are measured in a vehicle longitudinal direction, and two further acceleration information items may be based on acceleration values of the vehicle which are measured in opposite transverse vehicle directions, for example in the direction of the right and left sides of the vehicle.

Resulting acceleration information items are determined from the acceleration information items in a step 103. For this purpose, the acceleration information item may initially be preprocessed so that the resultant acceleration information items may also be determined from preprocessed acceleration information items. The preprocessing may include weighting of the acceleration information items. Appropriate weighting factors may be predetermined, or, for example, provided or adapted depending on the situation. The weighting factors may also be set as a function of an orientation of the acceleration sensors in the vehicle, and as a function of a vehicle type. In the determination, in each case an acceleration information item which is associated with the longitudinal direction may be linked to an acceleration information item which is associated with one of the transverse directions. In this way, for example, a first resultant acceleration information item may be determined which on a proportional basis takes an acceleration of the vehicle to the right side of the vehicle into account, and a second resultant acceleration information item may be determined which on a proportional basis takes an acceleration of the vehicle to the left side of the vehicle into account.

The resultant acceleration information items may be combined with one another in a step 105. For example, the resultant acceleration information items may be added together, subtracted from one another, or combined in some other suitable way.

The collision type may be determined in a step 107, based on the combination(s) of the resultant acceleration information items. In particular, a distinction may be made between head-on collisions and offset or angled collisions. It may also be determined on which side of the vehicle the collision has occurred, and whether it is necessary to deploy occupant protection means. For this purpose, in step 107 an evaluation algorithm may be executed which evaluates the combined information items determined from the resultant acceleration information items. This may be achieved with the aid of suitable threshold values, for example.

Figure 2:
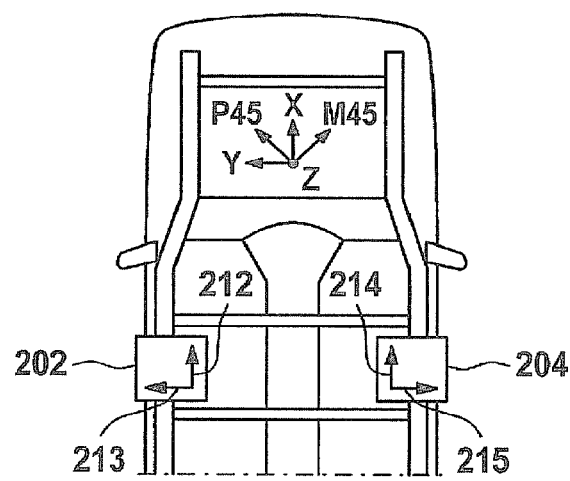
FIG. 2 shows an illustration of a system of acceleration sensors.

FIG. 2 shows a vehicle in which acceleration sensors 202, 204 are mounted according to one exemplary embodiment of the present invention. Acceleration sensor 202 is mounted approximately centrally on the left side of the vehicle, and acceleration sensor 204 is mounted approximately centrally on the right side of the vehicle. A coordinate system having an X, a Y, and a Z axis is also shown. The X axis designates a longitudinal axis in the direction of travel, the Y axis designates a transverse axis, and the Z axis designates a vertical axis of the vehicle. A direction P45 and a direction M45 are also plotted in the coordinate system. Direction vectors of directions P45, M45 are situated in the X-Y plane, and with respect to the X direction have an angular deviation which is provided with a respectively different algebraic sign, in the present exemplary embodiment, +45° and −45°.

Acceleration sensors 202, 204 may each be designed as dual-channel peripheral acceleration sensors, each of which is able to detect an acceleration 212, 214 in the X longitudinal direction and an acceleration 213, 215 in the Y transverse direction. According to this exemplary embodiment, both acceleration sensors 202, 204 are able to detect an acceleration in the direction of travel. Acceleration sensor 202 is also able to detect an acceleration 213 to the left side of the vehicle, i.e., in the Y direction, and acceleration sensor 204 is also able to detect an acceleration 215 to the right side of the vehicle, i.e., in the X direction.

Figure 3:
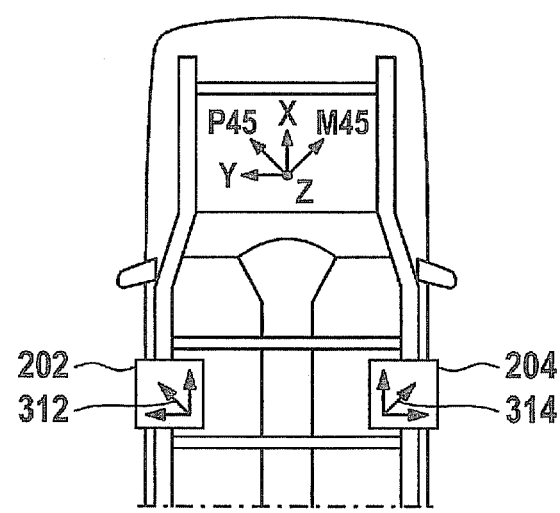
FIG. 3 shows an illustration of resultant acceleration signals of the system shown in FIG. 2.

FIG. 3 shows a graphical illustration of a determination of resultant acceleration information items 312, 314 for acceleration sensors 202, 204 described with reference to FIG. 2. Resulting acceleration information items 312, 314 may be computed in the form of derived acceleration variables by vector addition, in the present case, for example, in relation to a 45° direction. According to this exemplary embodiment, resultant acceleration information item 312 indicates an acceleration of the vehicle in direction P45, i.e., obliquely toward the left front side, and resultant acceleration information item 314 indicates an acceleration of the vehicle in direction M45, i.e., obliquely toward the right front side. The collision type may be ascertained according to the present invention based on resultant acceleration information items 312, 314.

For a signal comparison, it has been shown that including the Y components of the signals, in contrast to evaluating just the X components, is very advantageous. The reason is that the Y components present in offset and angled collisions are intensified on the side facing the collision, while these components are diminished on the side facing away from the collision.

Figure 4:
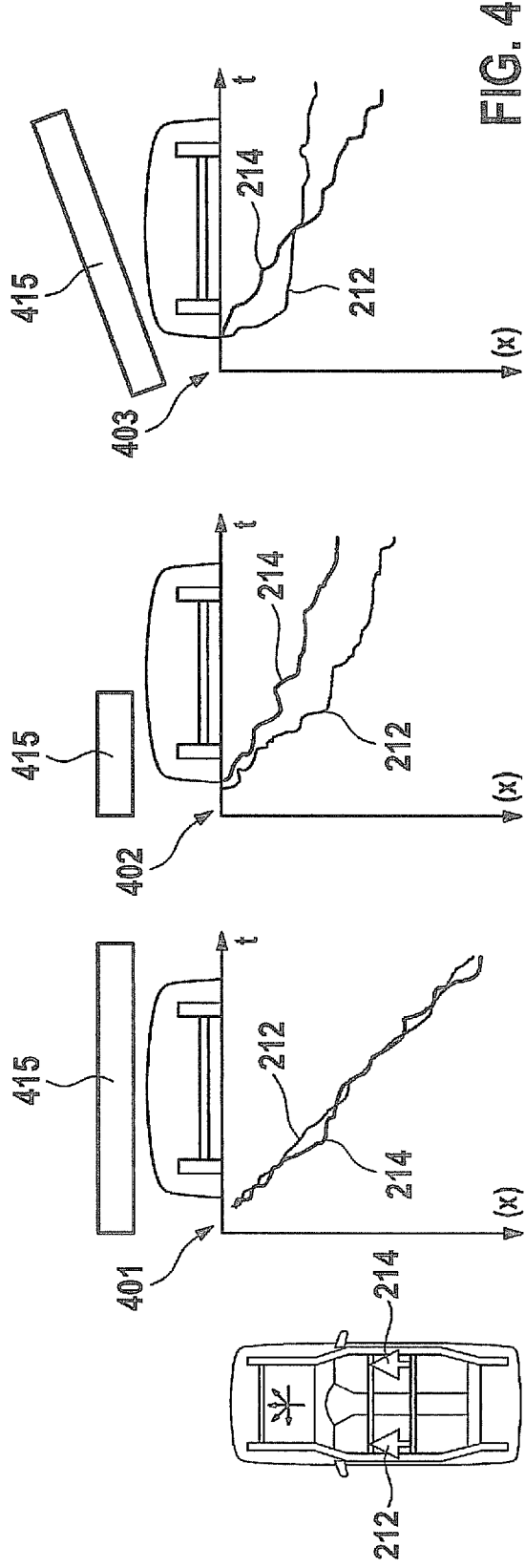
FIG. 4 shows an illustration of acceleration signals for different collision types.
Figure 5:
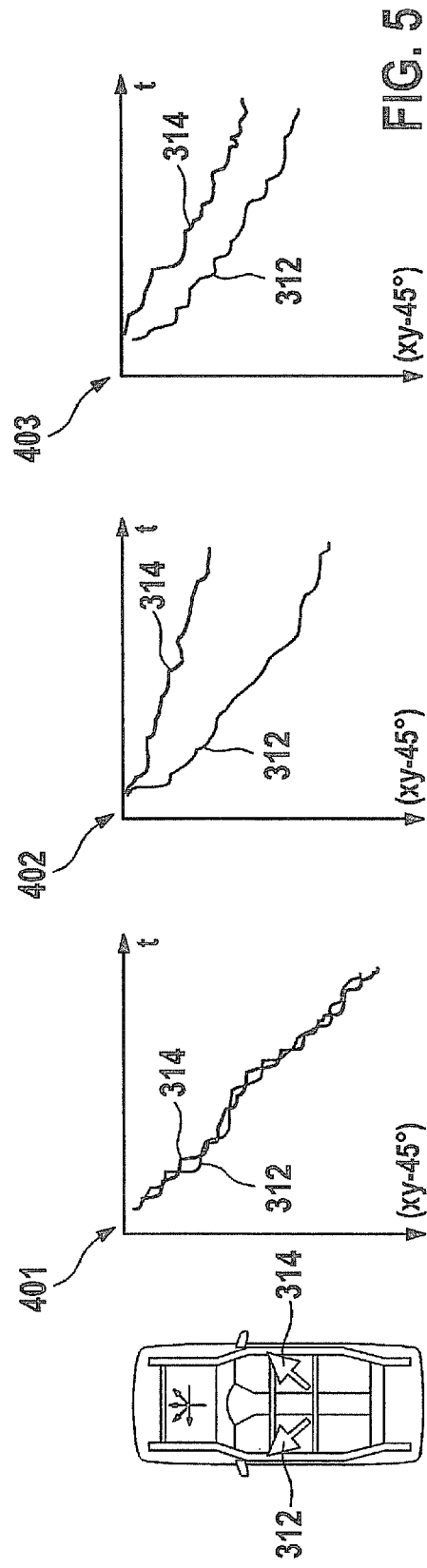
FIG. 5 shows an illustration of resultant acceleration signals for different collision types.

FIGS. 4 and 5 show this difference for the various collision types. In each case a typical curve of a low pass-filtered acceleration signal or also of the integrated acceleration signal from the left and right sensor shown in FIG. 2 is illustrated for the three different collision types: head-on collision at an angle of 0°, offset collision, and angled collision.

At the left edge, FIG. 4 shows the vehicle illustrated in FIG. 2 together with the two sensors, each of which provides an acceleration signal 212, 214 in the X direction. Acceleration signal curves 212, 214 associated with the sensors are plotted as a function of time in each of the three diagrams 401, 402, 403. In each case, time t is plotted on the abscissa, and low pass-filtered acceleration signals 212, 214 in the X direction are plotted on the ordinate.

Diagram 401 is associated with a 0°, i.e., flat frontal, collision in which the vehicle strikes a barrier 415 head-on and with complete overlap. Acceleration signals 212, 214 have a practically identical linear curve.

Diagram 402 is associated with an offset collision (ODE) in which the vehicle strikes barrier 415 head-on, but with only half-side overlap. The overlap is present on the left side, on which sensor 212 is mounted. Acceleration signals 212, 214 have different curves. The slope of acceleration signal 214 is smaller than that of acceleration signal 212.

Diagram 403 is associated with an angled collision in which the vehicle strikes barrier 415 at an angle. The left side of the vehicle, on which sensor 212 is mounted, initially strikes barrier 415. Acceleration signals 212, 214 have different curves. Acceleration signal 214 has a linear curve. Acceleration signal 212 initially has a slope that is greater than that of acceleration signal 214, and after a brief period of time has a smaller slope, so that acceleration signals 212, 214 intersect.

At the left edge, FIG. 5 shows the vehicle illustrated in FIG. 3 together with the two sensors, data provided by the sensor mounted on the left being used to determine a resultant acceleration signal 312 in direction P45, and data provided by the sensor mounted on the right being used to determine a resultant acceleration signal 314 in direction M45. Corresponding to FIG. 4, once again three diagrams 401, 402, 403 are shown which indicate acceleration signal curves 312, 314 associated with the sensors for the respective collisions, as a function of time. In each case, time t is plotted on the abscissa, and low pass-filtered acceleration signals 212, 214 in the XY 45° direction are plotted on the ordinate.

Diagram 401 once again is associated with the 0° collision. Acceleration signals 312, 314 have a practically identical linear curve.

Diagram 402 once again is associated with the offset collision. Acceleration signals 312, 314 have different curves. The slope of acceleration signal 314 is much greater than that of acceleration signal 312.

Diagram 403 once again is associated with the angled collision. Acceleration signals 312, 314 have different curves. Acceleration signal 314 initially has a slope that is smaller than that of acceleration signal 312. Acceleration signals 312, 314 subsequently have practically identical slopes, so that acceleration signals 312, 314 do not intersect.

A function for collision type recognition according to one exemplary embodiment of the present invention is described below. The function for collision type recognition uses the XY 45° signals, described with reference to FIGS. 3 and 5, as input signals.

Figure 6:
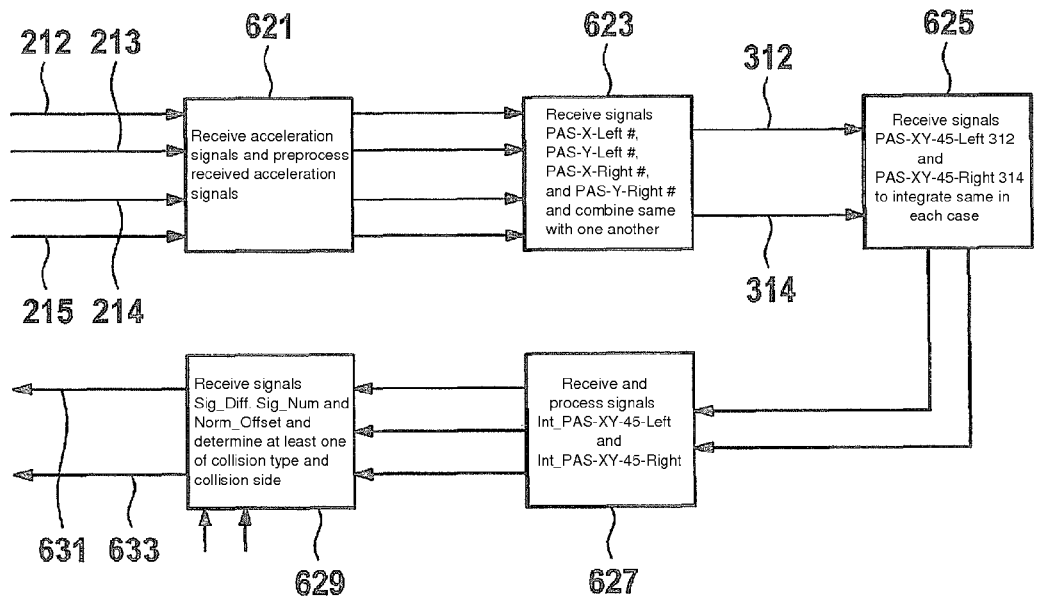
FIG. 6 shows a block diagram of a method for collision type recognition according to another exemplary embodiment of the present invention.

FIG. 6 shows a block diagram of a method for collision type recognition according to another exemplary embodiment of the present invention. Individual method steps may be implemented in different modules. The method has a pre-processing module 621, a combination module 623, an integration module 625, a feature computation module 627, and a collision type recognition module 629.

Module 621 is designed to receive acceleration signals, for example of the sensors shown in FIG. 2. According to this exemplary embodiment, module 621 receives the signals from two sensors, each of which provides an acceleration signal in vehicle longitudinal direction X and an acceleration signal in vehicle transverse direction Y. According to this exemplary embodiment, module 621 is designed to receive a PAS-X-Left signal 212, a PAS-Y-Left signal 213, a PAS-X-Right signal 214, and a PAS-Y-Right signal 215, to subject same to preprocessing, and to provide PAS-X-Left #, PAS-Y-Left #, PAS-X-Right #, and PAS-Y-Right # as preprocessed signals to combination module 623. The preprocessing may include low-pass filtering, for example.

Input signals PAS-X-Left, PAS-Y-Left represent left-sided acceleration signals in the X and Y direction, respectively. Input signals PAS-X-Right, PAS-Y-Right represent right-sided acceleration signals in the X and Y direction, respectively. Signals PAS-X-Left # represent left-sided acceleration signals in the X or Y direction downstream from preprocessing module 621. Signals PAS-X-Right # represent right-sided acceleration signals in the X or Y direction downstream from preprocessing module 621.

Module 623 is designed to receive signals PAS-X-Left #, PAS-Y-Left #, PAS-X-Right #, and PAS-Y-Right # and combine same with one another in order to determine and provide resultant acceleration signals 312, 314. According to this exemplary embodiment, module 623 is designed to determine a PAS-XY-45-Left signal 312 from signals PAS-X-Left # and PAS-Y-Left #, and to determine a PAS-XY-45-Right signal 314 from signals PAS-X-Right # and PAS-Y-Right #. Resulting acceleration signals 312, 314 may correspond to the acceleration information items shown in FIG. 3. Module 623 may be designed to determine resultant acceleration signal 312 by vector addition of signals PAS-X-Left # and PAS-Y-Left #, and to determine resultant acceleration signal 314 by vector addition of signals PAS-X-Right # and PAS-Y-Right #.

Module 625 is designed to receive signals PAS-XY-45-Left 312 and PAS-XY-45-Right 314, to integrate same in each case according to this exemplary embodiment, and to provide same as integrated signals Int_PAS-XY-45-Left and Int_PAS-XY-45-Right to module 627.

Module 627 is designed to receive and process signals Int_PAS-XY-45-Left and Int_PAS-XY-45-Right. According to this exemplary embodiment, module 627 is designed to determine a Sig_Diff signal, a Sig_Sum signal, and a Norm_Offset signal based on signals Int_PAS-XY-45-Left and Int_PAS-XY-45-Right, and to provide same to module 629. The Sig_Diff signal may represent a difference, and Sig_Sum signal may represent a sum, of signals Int_PAS-XY-45-Left and Int_PAS-XY-45-Right.

The Norm_Offset signal may represent a ratio of signals Sig_Diff signal and Sig_Sum.

Module 629 is designed to receive signals Sig_Diff, Sig_Sum, and Norm_Offset, and on the basis thereof to determine and provide information concerning collision type 631 and information concerning collision side 633. Module 629 may also be designed to receive a signal Algo_Timer and a signal Algo_Dv, and to take information items 631, 633 into account in the determination.

Signal Algo_Timer represents a time basis which indicates how long the instantaneously recognized collision event has already lasted. Signal Algo_Dv describes a decrease in speed of the vehicle in the longitudinal direction which has already occurred in the instantaneous collision event.

Filtering, generally low-pass filtering, takes place in preprocessing module 621. Alternatively, averaging, for example in the form of window integration or band pass filtering, is possible.

Weighted vector addition or unweighted vector addition of the sensor signals takes place in combination module 623. The ratio of X and Y components in the resultant overall signal may be influenced by the magnitude of the individual weighting factors. For the weighting, the appropriate signal or the appropriate signal value may be multiplied by a weighting value.

The following apply:

$$PAS\text{-}XY\text{-}45\text{-}Left = k_{X\text{-}Left} * PAS\text{-}X\text{-}Left\# + k_{Y\text{-}Left} * PAS\text{-}Y\text{-}Left\#$$

$$PAS\text{-}XY\text{-}45\text{-}Right = k_{X\text{-}Right} * PAS\text{-}X\text{-}Right\# + k_{Y\text{-}Right} * PAS\text{-}Y\text{-}Right\#$$

Weighting factors $k_{X/Y\text{-}Left/Right}$ are variable, and may be application parameters.

Integration, i.e., time-discrete summation, of the signals takes place in integration module 625.

$$\text{Int\_PAS} - XY - 45 - \text{Left} = \sum_{n=0}^{n} PAS - XY - 45 - \text{Left}$$

$$\text{Int\_PAS} - XY - 45 - \text{Right} = \sum_{n=0}^{n} PAS - XY - 45 - \text{Right}$$

As an alternative to single integration, double integration or computation of the signal energy may be carried out.

Some input variables for the subsequent collision type recognition are computed in feature computation module 627.

The following apply:

$$\text{Sig\_Diff} = \text{Int\_}PAS\text{-}XY\text{-}45\text{-}Left - \text{Int\_}PAS\text{-}XY\text{-}45\text{-}Right$$

$$\text{Sig\_Sum} = \text{Int\_}PAS\text{-}XY\text{-}45\text{-}Left + \text{Int\_}PAS\text{-}XY\text{-}45\text{-}Right$$

$$\text{Norm\_Offset} = \text{Sig\_Diff}/\text{Sig\_Sum}$$

Collision type recognition module 628 may be subdivided into multiple submodules.

Figure 7:
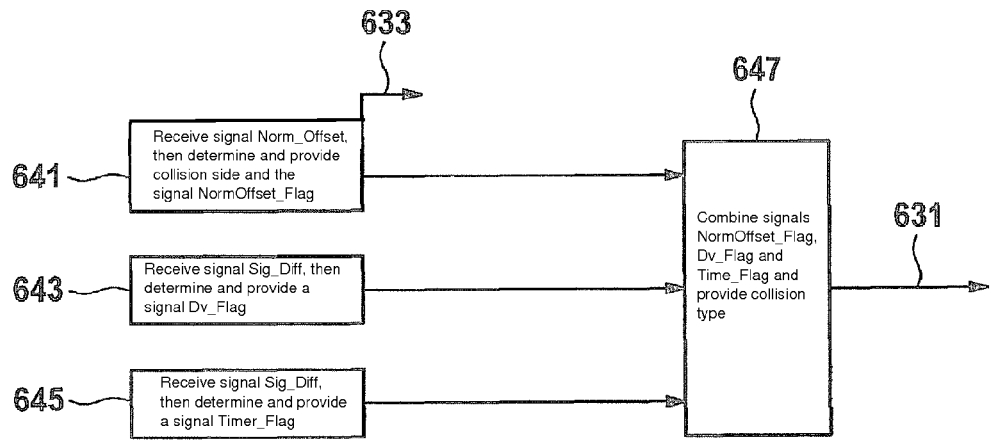
FIG. 7 shows a block diagram of an algorithm for collision type recognition according to one exemplary embodiment of the present invention.

FIG. 7 shows a block diagram of collision type recognition module 629 according to one exemplary embodiment of the present invention. Module 629 has a NormOffset path 641, a Dv path 643, a timer path 645, and a linkage unit 647.

NormOffset path 641 is designed to receive signal Norm_Offset, and on the basis thereof to determine and provide the collision side as signal CrashSide 633 and a signal NormOffset_Flag. For this purpose, signal Norm_Offset may undergo one or multiple threshold value comparisons. The threshold value comparison(s) may be carried out within a predetermined evaluation window. The evaluation window may begin, for example, when a predetermined duration after a starting point in time has elapsed, or after a certain acceleration state is achieved.

Dv path 643 is designed to receive signal Sig_Diff, and on the basis thereof to determine and provide a signal Dv_Flag. For this purpose, signal Sig_Diff or an absolute value of signal Sig_Diff may undergo one or multiple threshold value comparisons. The threshold value comparison(s) may be carried out within a predetermined time window after the collision begins. Timer path 645 is designed to receive signal Sig_Diff, and on the basis thereof to determine and provide a signal Timer_Flag. For this purpose, signal Sig_Diff or an absolute value of signal Sig_Diff may undergo one or multiple threshold value comparisons. The threshold value comparison(s) may be carried out within a predetermined time window after the collision begins. Linkage unit 647 is designed to receive signals NormOffset_Flag, Dv_Flag, and Timer_Flag, and on the basis thereof to determine and provide collision type 631. Linkage unit 647 may be designed as an AND module. Linkage unit 647 may carry out an AND operation of the input signals without further evaluation taking place. Signal 631 may result as a binary signal, which may indicate whether or not an angled/offset collision has been recognized. This decision may be retained for an applicable retention time.

According to one exemplary embodiment, the algorithm implemented in individual subpaths 641, 643, 645 by module 629 shown in FIG. 7 functions as follows:

In module NormOffset path 641, input signal Norm_Offset is equal to zero in the event of a perfectly symmetrical collision. Otherwise, nonzero values are obtained, the algebraic sign of signal Norm_Offset indicating the collision direction, i.e., the left side or the right side.

With regard to signal CrashSide 633, which indicates the collision side, this signal is greater than zero for left-sided angled or offset collisions, and is less than zero for right-sided angled or offset collisions.

With regard to signal NormOffset_Flag, this signal is equal to one as soon as the absolute value of signal Norm_Offset exceeds a threshold NormOffset_Thd, and is equal to zero if no threshold exceedance occurs.

The comparison of the values of signal Norm_Offset to threshold NormOffset_Thd may take place within an active window. For example, the comparison may be carried out after signal Sig_Sum has reached or exceeded a predetermined value. Alternatively, the comparison may be carried out after a predetermined time period after the start of a collision has elapsed.

Similarly, the active window may be delimited at the right edge by a further threshold; i.e., for example, the comparison may no longer be carried out after that point in time if signal Sig_Sum has reached or exceeded a predetermined value. Here as well, a predetermined time period is possible as a limit as an alternative to signal Sig_Sum.

Figure 8:
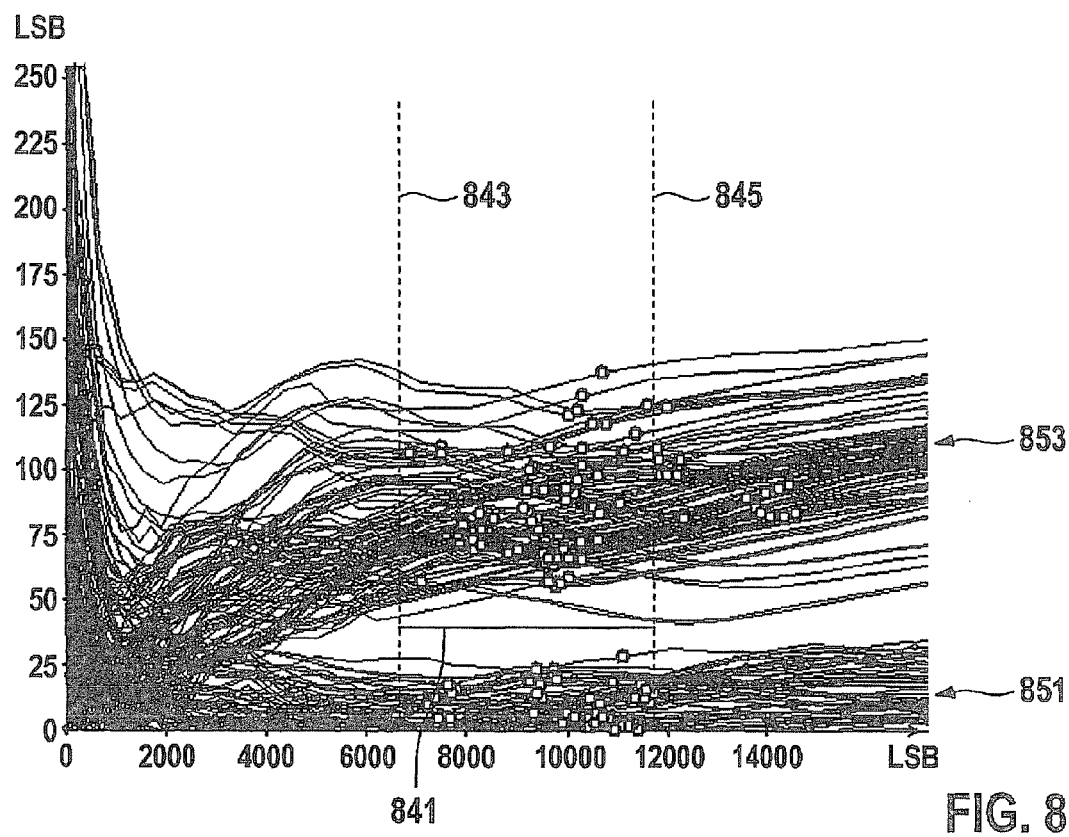
FIGS. 8 through 10 show graphical illustrations of signal curves, ascertained from the acceleration signals, according to exemplary embodiments of the present invention.

FIG. 8 shows an illustration of typical signal curves of an absolute value of signal Norm_Offset, plotted as a function of signal Sig_Sum. Values of signal Sig_Sum are plotted on the abscissa, and values of signal |Norm_Offset| are plotted on the ordinate. Also shown are a threshold NormOffset_Thd 841 and an active window which is situated between two limiting values StabMin_Thd 843 and StabMax_Thd 845. A comparison of the values of signal |Norm_Offset|, plotted as a function of values of signal Sig_Sum, to threshold NormOffset_Thd 841 may be carried out continuously, or only within the active window. Signal values of signal |Norm_Offset| which result from a flat frontal (0°) collision and which are below threshold NormOffset_Thd 841 are present within the active window. On the other hand, signal values of signal |Norm_Offset| which result from an angled collision or an offset collision are above threshold NormOffset_Thd 841.

By comparing the signal curve of signal |Norm_Offset| to threshold value NormOffset_Thd 841, it may thus be recognized whether an angled or offset collision, or a head-on collision with complete overlap, is involved.

As shown in FIG. 8, an active window may optionally be set with the aid of the two parameters StabMin_Thd 843 and StabMax_Thd 845. According to this exemplary embodiment, the threshold value comparison between NormOffset_Thd and the absolute value of input signal Norm_Offset is carried out only within the active window. Thus, the comparison is carried out only when the summed acceleration signals reach or exceed predetermined value StabMin_Thd 843, and predetermined value StabMax_Thd 845 has not yet been reached or exceeded.

Figure 9:
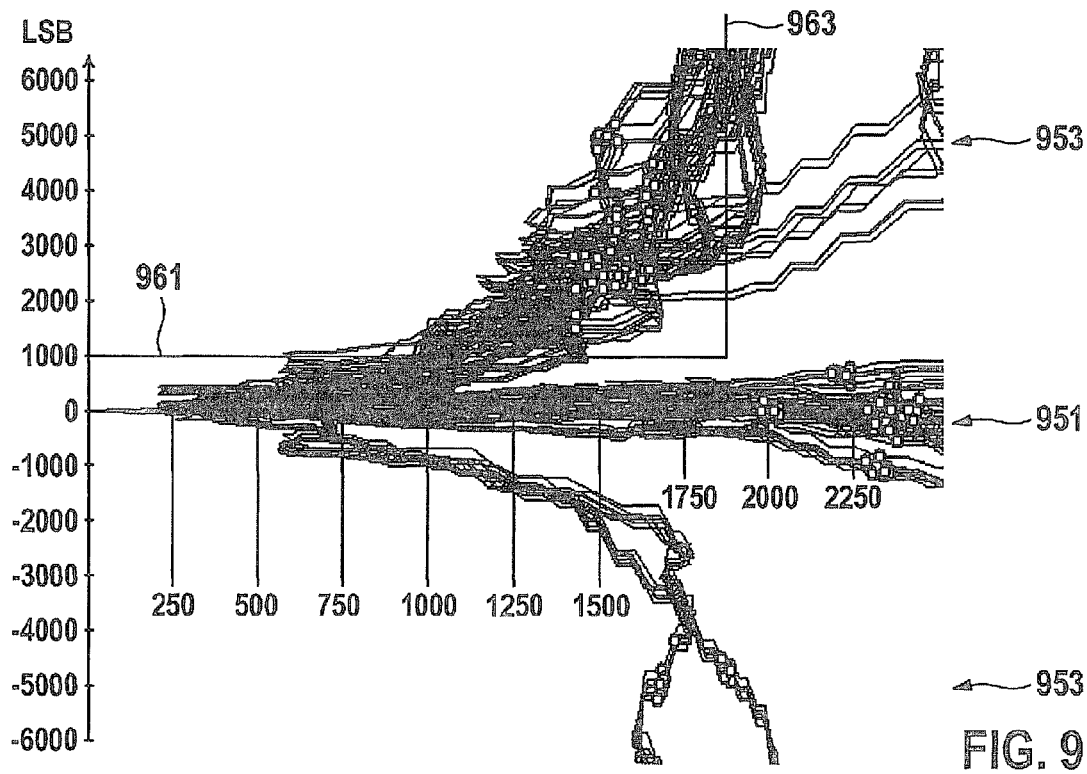

FIG. 9 shows a curve of signal Sig_Diff for module Dv path 643. Values of signal Algo_Dv are plotted on the abscissa, and values of signal Sig_Diff are plotted on the ordinate. Thus, a series of values of signal Sig_Diff is plotted as a function of the values of signal Algo_Dv. Algo_Dv denotes the decrease in speed of the vehicle in the longitudinal direction which has already occurred in the instantaneous collision event. A threshold value SigDiffDv_Thd 961 and a threshold value DisableDv_Thd 963 are also shown.

Typical signal curves 951 resulting from a flat frontal (0°) collision are below threshold value SigDiffDv_Thd 961. Typical signal curves 953 resulting from an angled collision or an offset collision exceed value SigDiffDv_Thd 961 before reaching threshold value DisableDv_Thd 963.

By comparing the signal curve of signal Sig_Diff to threshold value SigDiffDv_Thd 961, it may thus be recognized whether an angled or offset collision, or a head-on collision with complete overlap, is involved.

Signal Dv_Flag is equal to zero if |SigDiff|≤SigDiffDv_Thd, and signal Dv_Flag is equal to one if |SigDiff|>SigDiffDv_Thd.

For Algo_Dv>DisableDv_Thd, the threshold value comparison is no longer carried out.

The comparison of the values of signal Sig_Diff to threshold SigDiffDv_Thd may be carried out, beginning at the start of a collision, until signal Algo_Dv has reached or exceeded a predetermined value. Alternatively, the comparison may be carried out for a predetermined time period after the start of a collision.

For timer path module 645, signal Timer_Flag is equal to zero if |SigDiff|≤SigDiff_Timer_Thd, and signal Timer_Flag is equal to one if |SigDiff|>SigDiffTimer_Thd.

For Algo_Timer>DisableTimer_Thd, the threshold value comparison is no longer carried out.

The comparison of the values of signal Sig_Diff to threshold SigDiffTimer_Thd may be carried out, beginning at the start of the collision, until signal Algo_Timer has reached or exceeded a predetermined value.

Figure 10:
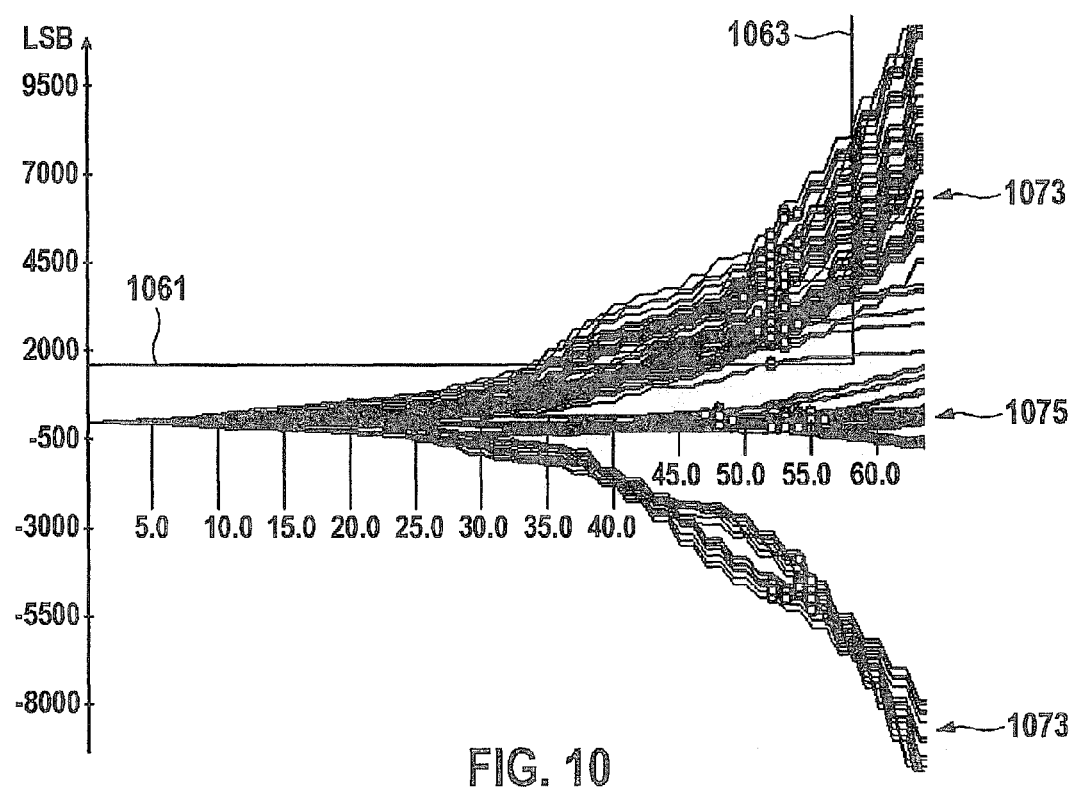

FIG. 10 shows a curve of signal Sig_Diff for timer path module 645. Values of signal Algo_Timer are plotted on the abscissa, and values of signal Sig_Diff are plotted on the ordinate. Thus, a series of values of signal Sig_Diff is plotted as a function of the values of signal Algo_Timer. A threshold value SigDiffTimer_Thd 961 and a threshold value DisableTimer_Thd 963 are also shown.

Typical signal curves 1073, which result from an angled collision or an offset collision, exceed threshold value SigDiffTimer_Thd 1061 before reaching threshold value DisableTimer_Thd 1063. Typical signal curves 1075, which result from a collision in which restraint means are not deployed, a so-called nondeployment collision (AZT), are below threshold value SigDiffTimer_Thd 1061.

By comparing the signal curve of signal Sig_Diff to threshold value SigDiffTimer_Thd 1061, it may thus be recognized whether an angled or offset collision is involved in which occupant protection means are to be deployed, or whether a nondeployment collision is involved.

As an alternative to vector addition of the two X and Y channels of a dual-channel single sensor, vector addition based on distributed sensors is possible, for example, to offset X components of upfront sensors against Y components of peripherally or centrally mounted Y sensors.

The exemplary embodiments which are described and shown in the figures are selected only as examples. Different exemplary embodiments may be combined with one another in their entirety, or with respect to individual features. In addition, one exemplary embodiment may be supplemented with features of another exemplary embodiment. Furthermore, method steps according to the present invention may be repeated and carried out in a sequence other than that described. If an exemplary embodiment includes an "and/or" conjunction between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for ascertaining a type of collision of a vehicle, comprising:
   receiving, via a reception interface, a first acceleration information item, a second acceleration information item, a third acceleration information item, and a fourth acceleration information item, wherein the first acceleration information item represents an acceleration of the vehicle in a first direction, the second acceleration information item represents an acceleration of the vehicle in a second direction, the third acceleration information item represents an acceleration of the vehicle in a third direction, and the fourth acceleration information item represents an acceleration of the vehicle in a fourth direction, the first and third directions each having a main component in a vehicle longitudinal direction, and the second and fourth directions each having a main component in mutually opposite vehicle transverse directions;
   determining a first resultant acceleration information item from the first acceleration information item and the second acceleration information item;
   determining a second resultant acceleration information item from the third acceleration information item and the fourth acceleration information item;
   combining the first resultant acceleration information item and the second resultant acceleration information item to obtain at least one evaluation information item;
   ascertaining the collision type based on the at least one evaluation information item;
   comparing a difference to a second predetermined threshold value; and
   deploying a passenger restraint unit during the collision based on the comparison between the difference and the second predetermined threshold value,
   wherein the difference is:
      formed from the first resultant acceleration information item and the second resultant acceleration information item in the combining step; and
      compared to at least a first predetermined threshold value to ascertain the collision type.

2. The method as recited in claim 1, wherein starting points of the main components of the first direction and the second direction are offset with respect to one another in relation to the vehicle transverse direction.

3. The method as recited in claim 1, wherein:
   the first resultant acceleration information item is determined by vector addition of the first and second acceleration information items; and
   the second resultant acceleration information item is determined by vector addition of the third and fourth acceleration information items.

4. The method as recited in claim 1, further comprising:
   weighting the first acceleration information item using a first weighting value to obtain a weighted first acceleration information item;
   weighting the second acceleration information item using a second weighting value to obtain a weighted second acceleration information item;
   weighting the third acceleration information item using a third weighting value to obtain a weighted third acceleration information item; and
   weighting the fourth acceleration information item using a fourth weighting value to obtain a weighted fourth acceleration information item;
   wherein the first resultant acceleration information item is determined from the weighted first acceleration information item and the weighted second acceleration information item, and the second resultant acceleration information item is determined from the weighted third acceleration information item and the weighted fourth acceleration information item.

5. The method as recited in claim 4, wherein each of the first weighting value, the second weighting value, the third weighting value, and the fourth weighting value is set as a function of an orientation of acceleration sensors in the vehicle and as a function of a vehicle type.

6. The method as recited in claim 4, further comprising:
   integrating the first resultant acceleration information item;
   integrating the second resultant acceleration information item, and
   wherein the at least one evaluation information item is obtained by combining the integrated first resultant acceleration information item and the integrated second resultant acceleration information item.

7. The method as recited in claim 1, wherein the collision type is ascertained as one of an angled collision, an offset collision, or a head-on collision.

8. The method as recited in claim 1, further comprising: forming a sum from the first resultant acceleration information item and the second resultant acceleration information item in the combining step; and forming a quotient from the difference and the sum; wherein the quotient is compared to a further threshold value in order to at least one of (i) recognize the collision type and (ii) determine a side of the vehicle involved in the collision.

9. The method as recited in claim 1, wherein each of the first acceleration information item, the second acceleration information item, the third acceleration information item, and the fourth acceleration information item is provided by an acceleration sensor mounted in the vehicle.

10. The method as recited in claim 1, wherein the collision type is ascertained as one of a collision on a right side of the vehicle or a collision on a left side of the vehicle.

11. The method as recited in claim 1, further comprising:
    filtering, by at least one low pass filter, the first acceleration information item, the second acceleration information item, the third acceleration information item, and the fourth acceleration information item.

12. A control unit for ascertaining a type of collision of a vehicle, comprising:
    means for receiving, via a reception interface, a first acceleration information item, a second acceleration information item, a third acceleration information item, and a fourth acceleration information item, wherein the first acceleration information item represents an acceleration of the vehicle in a first direction, the second acceleration information item represents an acceleration of the vehicle in a second direction, the third acceleration information item represents an acceleration of the vehicle in a third direction, and the fourth acceleration information item represents an acceleration of the vehicle in a fourth direction, the first and third directions each having a main component in a vehicle longitudinal direction, and the second and fourth directions each having a main component in mutually opposite vehicle transverse directions;

means for determining a first resultant acceleration information item from the first acceleration information item and the second acceleration information item;

means for determining a second resultant acceleration information item from the third acceleration information item and the fourth acceleration information item;

means for combining the first resultant acceleration information item and the second resultant acceleration information item to obtain at least one evaluation information item;

means for ascertaining the collision type based on the at least one evaluation information item;

means for comparing a difference to a second predetermined threshold value; and means for deploying a passenger restraint unit during the collision based on the comparison between the difference and the second predetermined threshold value, wherein the difference is:
 formed from the first resultant acceleration information item and the second resultant acceleration information item in the means for combining step, and
 compared to at least a first predetermined threshold value to ascertain the collision type.

13. A non-transitory computer-readable data storage medium storing a computer program having program codes which, when executed on a computer, performs a method for ascertaining a type of collision of a vehicle, the method comprising:

receiving, via a reception interface, a first acceleration information item, a second acceleration information item, a third acceleration information item, and a fourth acceleration information item, wherein the first acceleration information item represents an acceleration of the vehicle in a first direction, the second acceleration information item represents an acceleration of the vehicle in a second direction, the third acceleration information item represents an acceleration of the vehicle in a third direction, and the fourth acceleration information item represents an acceleration of the vehicle in a fourth direction, the first and third directions each having a main component in a vehicle longitudinal direction, and the second and fourth directions each having a main component in mutually opposite vehicle transverse directions;

determining a first resultant acceleration information item from the first acceleration information item and the second acceleration information item;

determining a second resultant acceleration information item from the third acceleration information item and the fourth acceleration information item;

combining the first resultant acceleration information item and the second resultant acceleration information item to obtain at least one evaluation information item;

ascertaining the collision type based on the at least one evaluation information item;

comparing a difference to a second predetermined threshold value; and deploying a passenger restraint unit during the collision based on the comparison between the difference and the second predetermined threshold value, wherein the difference is:
 formed from the first resultant acceleration information item and the second resultant acceleration information item in the means for combining step, and
 compared to at least a first predetermined threshold value to ascertain the collision type.

* * * * *